(12) United States Patent
Hines

(10) Patent No.: US 12,050,031 B2
(45) Date of Patent: Jul. 30, 2024

(54) DETECTOR AND TRACKER

(71) Applicant: PLANET A ENERGY, INC., Pasadena, CA (US)

(72) Inventor: Braden Eric Hines, Pasadena, CA (US)

(73) Assignee: Planet A Energy, Inc., Pasadena, CA (US)

( * ) Notice: Subject to any disclaimer, the term of this patent is extended or adjusted under 35 U.S.C. 154(b) by 332 days.

(21) Appl. No.: 17/347,389

(22) Filed: Jun. 14, 2021

(65) Prior Publication Data

US 2021/0389025 A1 Dec. 16, 2021

Related U.S. Application Data

(60) Provisional application No. 63/039,284, filed on Jun. 15, 2020.

(51) Int. Cl.
| | |
|---|---|
| *F24S 50/80* | (2018.01) |
| *F24S 20/20* | (2018.01) |
| *F24S 50/20* | (2018.01) |

(52) U.S. Cl.
CPC .............. *F24S 50/80* (2018.05); *F24S 20/20* (2018.05); *F24S 50/20* (2018.05)

(58) Field of Classification Search
CPC ............ F24S 50/80; F24S 20/20; F24S 50/20
See application file for complete search history.

(56) References Cited

U.S. PATENT DOCUMENTS

| | | | | |
|---|---|---|---|---|
| 4,349,733 | A * | 9/1982 | Beam | G01S 3/7861 250/203.1 |
| 4,440,155 | A * | 4/1984 | Maloof | F24S 20/20 359/743 |
| 5,616,913 | A * | 4/1997 | Litterst | G01S 3/7861 126/578 |
| 7,893,391 | B2 | 2/2011 | Horne et al. | |
| 8,592,738 | B1 * | 11/2013 | Kozin | H01L 31/0543 136/246 |
| 10,203,134 | B2 | 2/2019 | Johnson et al. | |
| 2008/0078435 | A1 | 4/2008 | Johnson | |
| 2012/0154941 | A1 * | 6/2012 | Zalevsky | F24S 23/00 359/853 |

(Continued)

FOREIGN PATENT DOCUMENTS

| | | |
|---|---|---|
| CN | 102829861 A | 12/2012 |
| CN | 111130444 A | 5/2020 |

(Continued)

OTHER PUBLICATIONS

Australia Intellectual Property Office Examination Report, dated Mar. 25, 2022, for Patent Application No. 2021203917, 7 pages.

(Continued)

*Primary Examiner* — David J Laux
(74) *Attorney, Agent, or Firm* — Lewis Roca Rothgerber Christie LLP

(57) ABSTRACT

A system for detecting the aim of a concentrating solar collector. The system includes a plurality of baffled photodetectors which observe various regions of the target focal plane through a set of tailored apertures. When configured in an exemplary way, the detector system can mimic the behavior of a quad cell while achieving a safe standoff distance from the intense solar radiation at the focus.

18 Claims, 9 Drawing Sheets

(56) References Cited

U.S. PATENT DOCUMENTS

| | | | |
|---|---|---|---|
| 2013/0239948 A1* | 9/2013 | Selig | F24S 23/80 |
| | | | 126/714 |
| 2013/0320189 A1* | 12/2013 | Goble | G01J 1/0266 |
| | | | 250/203.4 |
| 2017/0047987 A1* | 2/2017 | Pellegrino | H04L 27/261 |
| 2017/0108189 A1 | 4/2017 | Yeh et al. | |
| 2019/0078810 A1* | 3/2019 | Saeed | H02S 20/32 |
| 2020/0091859 A1 | 3/2020 | Chen et al. | |

FOREIGN PATENT DOCUMENTS

| | | |
|---|---|---|
| KR | 20010060471 A | 7/2001 |
| WO | 2007087343 A3 | 8/2007 |
| WO | 2012014236 A1 | 2/2012 |

OTHER PUBLICATIONS

Jin, X. et al., "A Sun Tracking System Design for a Large Dish Solar Concentrator", International Journal of Clean Coal and Energy, May 2013, pp. 16-20, Scientific Research.

Lee, C-Y. et al., "Sun Tracking Systems: A Review", Sensors, May 20, 2009, pp. 3875-3890, www.mdpi.com/journal/sensors.

\* cited by examiner

DETECTOR AND TRACKER

CROSS-REFERENCE TO RELATED APPLICATION(S)

The present non-provisional patent application claims priority to and the benefit of U.S. Provisional Patent Application No. 63/039,284, filed on Jun. 15, 2020, entitled "DETECTOR AND TRACKER", the content of which is incorporated herein by reference.

FIELD

Some embodiments of the invention relate generally to the field of solar energy, specifically devices that concentrate sunlight. Concentrators generally require tracking systems, which generally comprise one or more sensors to sense the aim of the concentrated sunlight beam.

BACKGROUND

Solar trackers are well established in the related art. One of the challenges with tracking for concentrated solar systems is that, while it would be ideal to place a camera or other tracking sensor at the focus of the beam, the focus of a concentrating solar collector is generally not a viable place to put a sensor, since it is intentionally subjected to intense solar radiation.

Related art systems include various techniques for working around this problem. One approach involves placing sensors in the "halo" around the focal region, where they will receive less radiation, but also necessarily may not be as effective.

Another approach is to place a camera at some distance from the focal plane and take images of the focal plane, thus inferring the incident illumination pattern, however camera systems are more expensive than simpler sensors.

One related art technique for tracking non-solar sources is a quadrant photodiode, where four photodiodes are provided in the region of the target, where they detect illumination patterns in the target region, allowing the calculation of pointing error. Quad cell detectors tend to be useful in systems where illumination levels are low or modest. But it is very difficult to provide a quadrant photodiode that can be placed at the focus of a solar concentrator and survive.

A related quadrant detector technique uses optical fibers that capture incident sunlight in a region of interest and forward the energy to remote photodetectors; the fibers in such a system are still exposed to intense solar radiation.

It would be desirable to have a device that had the low cost of a quadrant photodiode, but with the standoff distance characteristic of an imaging camera.

SUMMARY

According to an embodiment of the present invention, there is provided a system including: a concentrating solar collector, having a nominal focus within a target region; a first photodetector; and a first aperture between a first point in the target region and the first photodetector.

In some embodiments, the system further includes a first baffle configured to shield the first photodetector from light incident from a direction different from the direction from the first point.

In some embodiments, the system further includes: a second photodetector; a second aperture between a second point in the target region and the second photodetector, the second point being a different point from the first point; and a second baffle configured to shield the second photodetector from light incident from a direction different from the direction from the second point.

In some embodiments, wherein: the first photodetector is exposed, through the first aperture, to light emitted from within a first portion of the target region, the first portion of the target region including the first point; and the second photodetector is exposed, through the second aperture, to light emitted from within a second portion of the target region, the second portion of the target region including the second point.

In some embodiments, at most 50% of the first portion of the target region is within the second portion of the target region.

In some embodiments: a third portion of the target region includes the nominal focus; the third portion of the target region does not overlap the first portion of the target region; and the third portion of the target region does not overlap the second portion of the target region.

In some embodiments, the system further includes: a third photodetector; a third aperture between a third point in the target region and the second photodetector, the third point being a different point from the first point and a different point from the second point; a third baffle configured to shield the third photodetector from light incident from a direction different from the direction from the third point; a fourth photodetector; a fourth aperture between a fourth point in the target region and the fourth photodetector, the fourth point being a different point from the first point, a different point from the second point, and a different point from the third point; and a fourth baffle configured to shield the fourth photodetector from light incident from a direction different from the direction from the fourth point.

In some embodiments, the first baffle includes a tube.

In some embodiments, the first aperture is an end of the tube.

In some embodiments, at a first point on an interior surface of the first baffle the interior surface has a hemispherical diffuse reflectance of less than 90% at a wavelength of 500 nm, and an incident direction with an incidence angle of 60 degrees from the perpendicular to the interior surface at the first point.

In some embodiments, at a first point on an interior surface of the first baffle the interior surface has a specular reflectance of less than 30%.

In some embodiments, the first baffle includes a mask, the first aperture being an opening in the mask.

In some embodiments, the mask is at a proximal end of the tube.

In some embodiments, the mask is at a first distance from a proximal end of the tube, the first distance being at least 30% of the length of the tube.

In some embodiments, the tube has a length at least twice as great as a greatest transverse dimension of the first aperture.

In some embodiments, a distal end of the tube is at least twice as distant from the nominal focus as the proximal end of the tube.

In some embodiments, the system further includes: a diffusing aperture stop; and a second photodetector, the diffusing aperture stop being above the target region and having a central aperture, the system being configured: in a first alignment, to direct sunlight incident on the system from above through the central aperture of the diffusing aperture stop and onto the nominal focus; and in a second alignment, to direct sunlight onto a first point, on the diffusing aperture stop, adjacent to the central aperture, and to cause a portion of the sunlight to scatter from the first point into the second photodetector.

In some embodiments: the photodetector includes: an optical fiber, and a photosensor, wherein the optical fiber has: a proximal end configured to receive light, from the first point, through the first aperture, and a distal end, configured to couple light to the photosensor.

Figure 1:
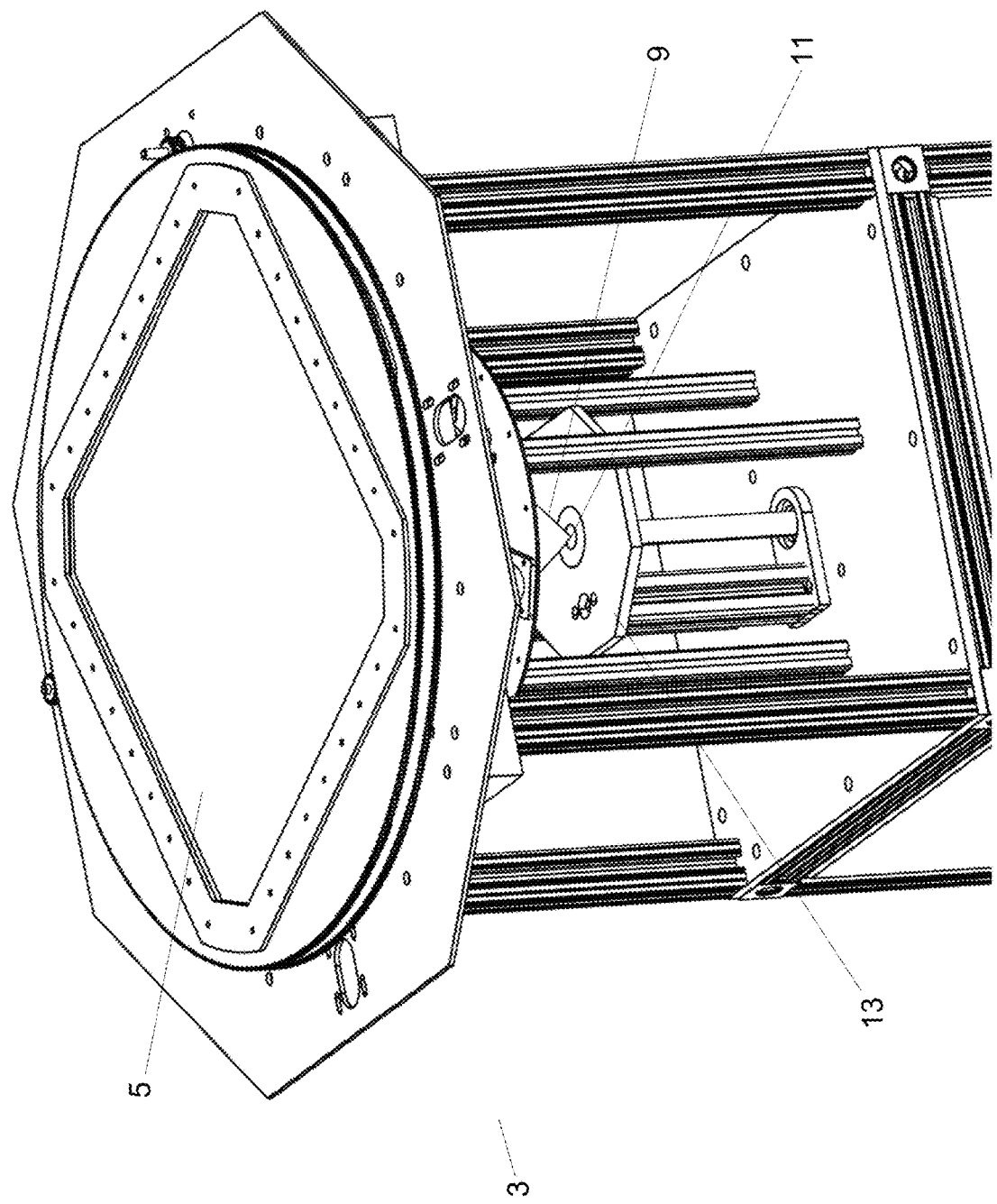
FIG. 1 shows an exemplary solar concentrating system that includes the present invention.
Figure 2:
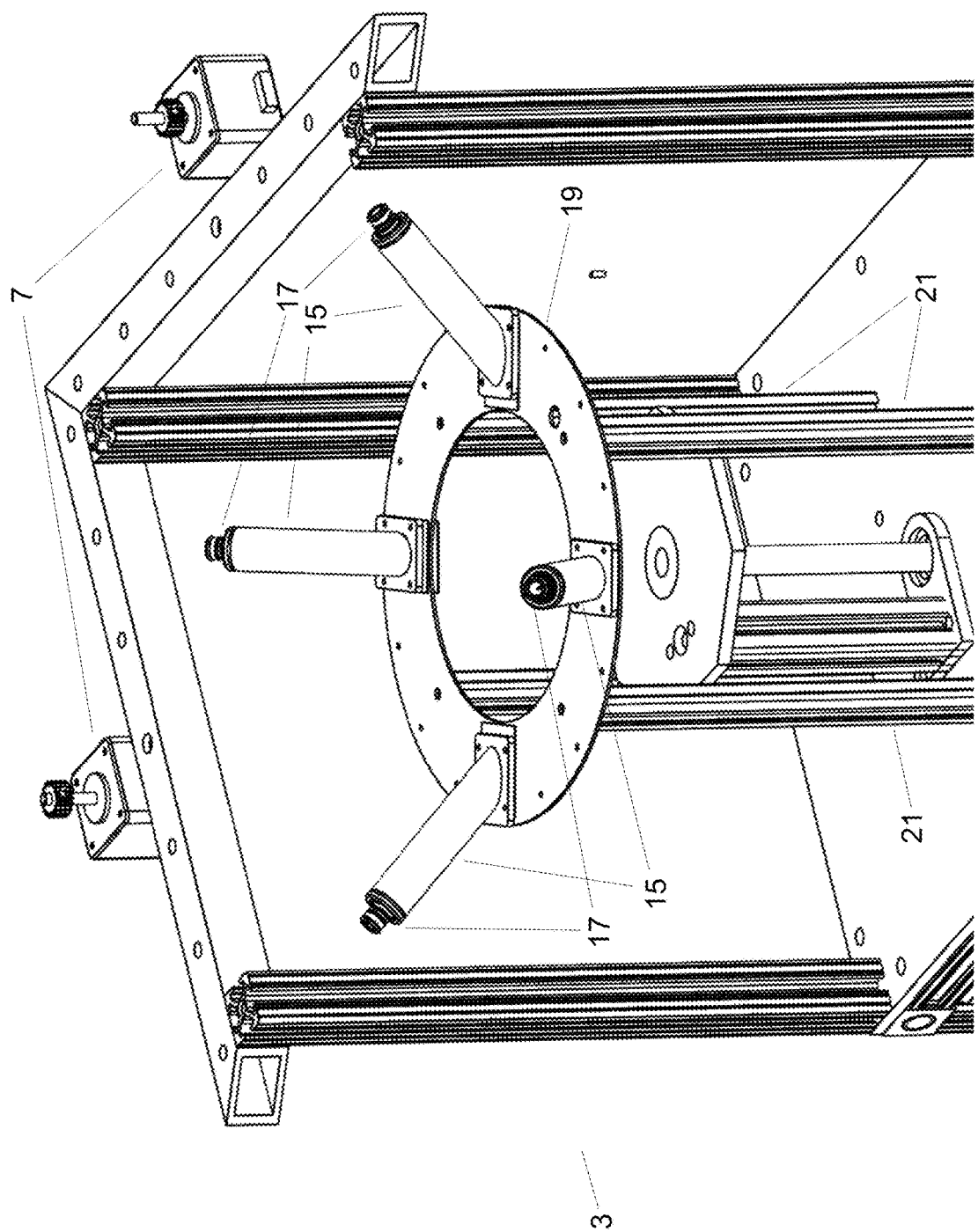
FIG. 2 shows an exemplary embodiment of a tracking sensor according to the present invention, in the context of an exemplary solar concentrating system. The figure is the same view as in FIG. 1, but with certain components removed to permit the tracking sensor to be seen.
Figure 3:
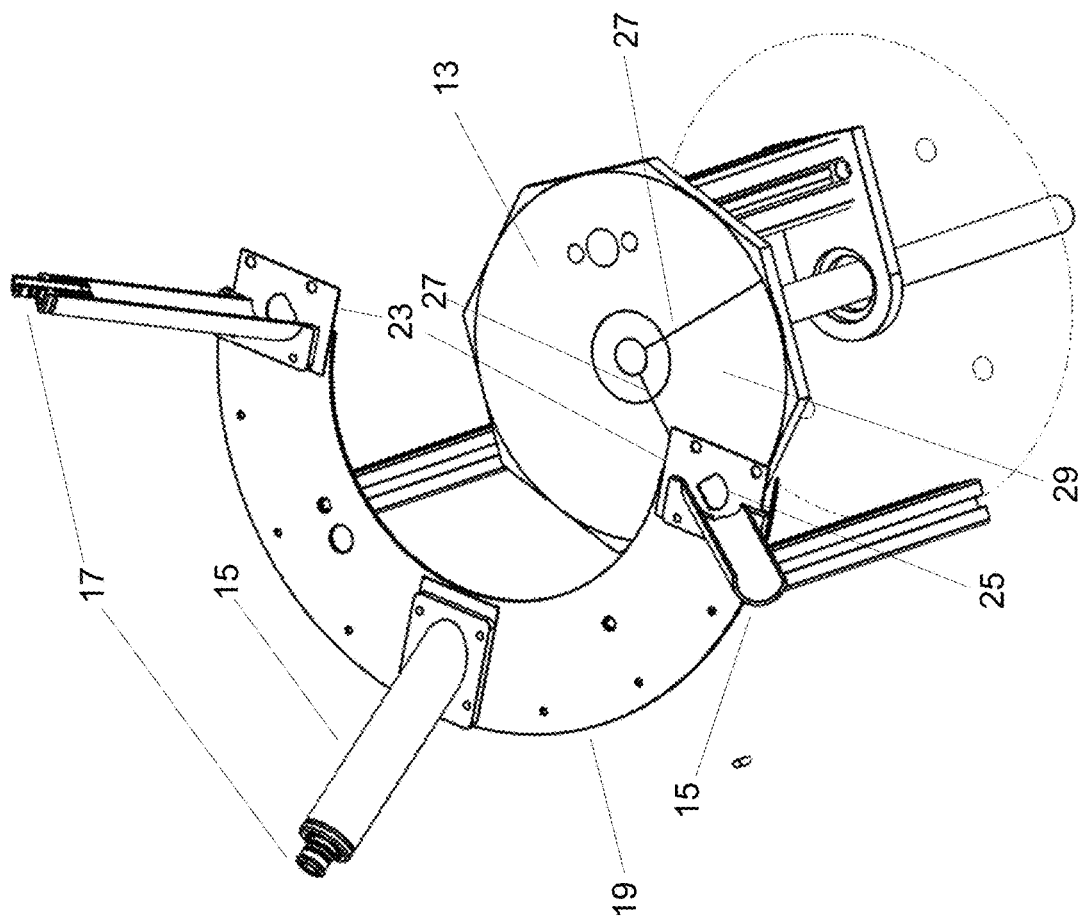
FIG. 3 is a cutaway view of the tracking sensor of FIG. 2, exposing the apertures and masks at the ends of the straws.

Each of FIGS. 1-3 is drawn to scale, for one embodiment.

DETAILED DESCRIPTION

Some embodiments of the invention relate to apparatus and methods to provide a tracking sensor for a concentrating solar energy collection system. Whereas the application of some embodiments of the invention disclosed herein is presented in the contexts of solar concentrating systems and of concentrating solar power, the apparatus and methods are generally applicable to any system in which it is desirable to sense the aim of an intense radiation source.

From the background description above, it can be seen that some related art tracking sensors for concentrating solar systems face challenges that may make them difficult or costly to implement, or suboptimally effective.

The present disclosure discloses a method and apparatus for a tracking sensor that is especially useful for sensing the aim of an intense radiation source, by combining the standoff distance of a camera with the low cost of a simple quadrant photodiode (or "quad cell"). With an intense radiation source, the light scattered from the target region is sufficiently bright to be readily observed by a remotely positioned photodetector, with a phototransistor being a good choice in many applications.

An embodiment of the invention thus includes four photodetectors, including devices such as photodiodes or phototransistors or photoresistors. But unlike the photodiodes of a classic quadrant photodiode, the photodetectors are placed at a safe distance from the focus of the solar concentrating system, and view the target region through a set of "straws" or narrow tubes, the ends of which may operate as apertures, which causes each photodetector to view a portion of the target region. The straws act as both apertures which set the field of view of each photodetector, and also as light baffles to prevent any extraneous light from reaching the photodetector. As used herein, the "target region" is the region, around the nominal focus, including the desired focal region as well as the region into which light spills when the converging beam is mispointed. One skilled in the art will appreciate that the terms "focal region" or "focal plane" may tend to be used by optical engineers concerned with the behavior of the converging beam, while the term "target region" may tend to be used be controls engineers concerned with controlling the aim of the converging beam, and of sensing the converging beam when mispointed; all three terms have similar meaning but one may be selected over the other based on context.

In this embodiment, the target region includes a diffuse reflecting surface, which tends to reflect and scatter a portion of the radiation impinging on the surface towards the photodetector as indirect radiation. The photodetector can sense the brightness of this diffuse surface, and thus infer the intensity of the radiation at that surface, by observing the indirect radiation scattered from the diffuse surface. If an appropriate set of straws is provided, the measurements from the four photodetectors approximate the measurements that would be made by a quad cell located in the target region, but the photodetectors are safe from damage.

In one embodiment, one or more of the straws include aperture masks, permitting tailoring of the exact field of view of each straw.

In one embodiment, a mask may be provided at the end of the straw proximal to the target.

In one embodiment, a straw may be provided that already includes the cross-sectional profile of a desired mask, helping to reduce part count.

One embodiment includes both the narrow-angle and wide-angle embodiments just described.

In one embodiment, the photodetectors are included in an electronic assembly which includes one or more amplification stages, and the amplified photodetector signals are provided as the inputs to one or more analog-to-digital converters, which may be read by a digital computer or microcontroller. The computer or microcontroller then may use the measured light intensity information to help aim the solar concentrator at the sun.

The systems, apparatus, and methods presented herein describe a tracking sensor for a solar energy collection system with proximal concentrating optics. Embodiments described herein are exemplary and do not represent all possible embodiments of the principles taught by the invention. In particular, embodiments of the invention have direct application in the fields of concentrating solar power and solar thermal heating. Nevertheless, the apparatus and methods described herein can be applied and adapted by those skilled in the art for use in any alternative application that requires aiming of an intense light source.

Several terms have been used throughout this document, and this paragraph recaps their meaning. An "aperture" comprises a hole in a mask, constraining a detector to view a particular region of the target region. The "target region" is the region (often a plane, but it does not have to be a plane) where the focus of the concentrating system is achieved. In some embodiments, the target region includes a physical diffuse target surface in order to help scatter light into the detectors. The word "region" used by itself may refer to the entire target region, or to a portion of it. "Scattering" refers to a process which turns a single incident ray of light into a cone of diffuse rays. Scattering may occur either upon reflection from a surface (e.g. a flat white surface) or upon transmission through a surface (e.g. frosted glass). Terms including "indirect illumination", "indirect radiation", "indirect light", "scattered light", "scattered radiation", "scattered rays", "diffuse rays", "diffuse reflection", and "indirect rays" refer to this diffuse illumination produced by a scattering surface. However, when a diffuse or scattered ray hits yet another surface and further scatters in a non-useful way, the resulting rays are considered "stray light" and are not intended to be included in our definition of indirect illumination. "Specular" reflections and rays, by contrast, refer to direct rays that reflect from a surface, wherein the angle of reflection of the ray is substantially equal to the angle of incidence, and wherein each incident ray produces a single reflected ray (with the caveat that no real-world reflection is truly specular—there is always a small diffuse reflection as well). Note that the internal reflections of rays within an optical fiber are not considered diffuse or indirect reflections—the internal reflections inside a fiber are actually direct and highly specular—the path of a given ray can be readily followed from input to output; rays do not generally scatter and diffuse inside a fiber.

Referring to FIG. 1, an exemplary sun-tracking solid state solar thermal energy collection system 3, of the type described in U.S. Pat. No. 10,203,134, which is incorporated herein by reference, includes movable concentrator optics 5, driven by a pair of motors 7 (hidden from view), to produce a focusing cone of light 9, aimed at a target point 11 located within a target region 13. The FIG. 1 system's optics include a Risley prism comprising a pair of rotating Fresnelized wedges followed by a Fresnel lens, but one skilled in the art will appreciate that any beam steering and focusing method may be used. In this exemplary system, the target region 13 comprises an octagonally shaped physical plate.

FIG. 1 shows the situation when concentrator system 3 is aimed perfectly at the sun. As the sun moves to a different position in the sky, this aimpoint will no longer be correct, and the focus of the light cone 9 will tend to be at a different point in the target region 13, away from the desired aim point 11.

In order to help implement a tracking system that keeps concentrator system 3 correctly aimed at the sun, it is desirable to provide a sensing system that can measure the pointing error. A tracking algorithm can then use that error information to actuate the motors 7 to correct the aim of the optics 5 so as to help bring the focus back to the desired aimpoint 11.

The present invention provides a pointing sensor that can provide the pointing error measurement required by concentrator system 3. FIG. 2 shows an embodiment of the invention included in system 3. The figure shows the same system that was shown in FIG. 1, but parts have been removed to expose the tracking sensor.

Referring to FIG. 2, in the embodiment shown, the tracking sensor comprises a set of four tubes, or "straws" 15 which are aimed generally, but not exactly, towards the desired system aimpoint 11. (FIG. 2 also exposes motors 7 which were hidden from view in FIG. 1.)

The distal or "breech" end of each of the straws 15 includes a phototransistor assembly 17, which includes a phototransistor and a means of holding it in place at the end of the straw. The aim of the straw provides a view of the target region that permits viewing of indirect sunlight scattered from the target region. Not shown in a figure, a pair of wires is connected to each phototransistor and exits the breech end of phototransistor assembly 17, from whence it is routed to a digital controller for use in a tracking algorithm.

In the figure, the four straws are supported on a support ring 19 which is supported on posts 21. However, any convenient means may be used to support the straws in the desired locations and at the desired angles. The straws may be arranged symmetrically (e.g., all of the straws having substantially the same elevation angle, and the azimuth angles of the straws being uniformly distributed within 360 degrees), as illustrated in FIG. 2. In some embodiments, the straws are instead arranged asymmetrically, and, for example, they may all be on one side of the support ring 19. In the latter configuration, the regions observed by the straws may nonetheless be substantially symmetric (with suitably constructed masks).

FIG. 3 is a cutaway view of the tracking sensor assembly, showing an additional feature, mask 23, that is included at the proximal end of each of the straws in this embodiment. Each mask 23 includes an aperture 25, through which the corresponding phototransistor 17 can view the light scattered from target region 13.

The shape of aperture 25 restricts the field of view of phototransistor 17 to a smaller region than if no mask were provided, and the shape of aperture 25 maps to the shape of the region that is viewed by the phototransistor. In the figure, the "pie-shaped" opening (the opening having the shape of a sector of a circle) provided by aperture 25 permits viewing of quadrant 29 of target region 13, demarcated by lines 27. (Lines 27 are not actually provided in the assembly—they are provided in the figure for illustration purposes only.)

One skilled in the art will appreciate that aperture 25 is the projection of the viewed region defined by quadrant 29 into the plane of the mask 23.

One skilled in the art will further appreciate that there is advantage in placing mask 23 as close to target region 13 as is practicable. As the mask moves closer to the target region, aperture 25 becomes larger, which means that tolerances in its fabrication and placement tend to be correspondingly reduced. In a practical system, the proximity of mask 23 to target region 13 will be limited by the desire to protect the straws from damage by the intense solar radiation within converging light cone 9 if it is mispointed. (As mentioned above, one of the objectives of the present invention is to provide a standoff distance in order to prevent such damage.)

Because the detectors 17 are not provided in or near the target region 13, they do not form a conventional quad cell, but the detector/straw/mask/target region combination mimics the behavior of a quad cell by instead observing the indirect scattered light from the target region, and an algorithm suitable for use with a conventional quad cell may be applied to convert the four independent measurements into x and y pointing errors in the focal plane. The tracking system may then convert these x and y focal plane errors into errors in the angular position of the optics, which may then be converted into servo control signals for the motors 7.

Many other useful embodiments exist in addition to the exemplary embodiment shown so far. For example, embodiments may include any useful detector, not just phototransistors. Photodiodes, photoresistors, or any other useful light sensing device may be used in place of the phototransistors 17 of the exemplary embodiment of FIG. 1.

In some embodiments, a photodetector includes an optical fiber that routes the light received by the photodetector at a proximal end of the optical fiber to the sensing device at a distal end of the fiber. In this context the sensing device (which may be, e.g., a photodiode, a phototransistor, or a photoresistor) may be referred to as a "photosensor" to distinguish it from other elements (e.g., the fiber) of the photodetector. The term "photodetector", as used herein, includes a photosensor as a special case; as such, a photodetector may include a fiber and a photodetector (the latter being, e.g., a photosensor). In one embodiment, optical fibers are provided at the locations of one or more of the photodetectors 17 of FIG. 1, and the corresponding photodetectors 17 are moved to a different location. In this embodiment, the fiber(s) transport the light from the original photodetector location(s) to the new photodetector location(s) (e.g., the locations of the photosensors), where the light may be sensed by the photodetector(s).

While the figures have shown four straws/masks/detectors, any convenient number may be used. The quad-cell-mimicking exemplary embodiment can be more generally described as viewing four equal regions, each region comprising a sector of a circle with an angle of 90 degrees. Any number of regions may be used. In some embodiments, three or more regions are used, to independently solve for x and y pointing errors.

An embodiment may choose to overlap the region of view of one or more of the detectors. An embodiment may use regions of any convenient shape, including but not limited to rectangular, circular, or any convenient shape.

Thus other embodiments may use 3, 5, or any useful number of regions. By way of example, using eight 90-degree overlapping regions would provide a system that could continue to function even if one of the sensors failed.

Other embodiments may include no mask at all; in such an embodiment, the aperture 25 may be the proximal end of the straw.

Some embodiments may provide a specially shaped straw that performs the function of a mask. For example, for an aperture in the shape of a sector of a circle, the proximal end of the straw (or the entire straw) may have an interior cross sectional shape that is a sector of a circle.

Some embodiments may include instead of or in addition to the mask at the proximal end of the straw, one or more masks at one or more positions in the straw that are not the most proximal end of the straw. (The straw may perform a light baffling function as well as hosting the aperture mask, and the functions need not be combined as in the embodiment of FIG. 3. In some embodiments, both functions are present. Light baffling helps to keep stray light from reaching the detector, while the mask defines a specific target region of interest.)

Some embodiments may provide the mask and straw as a single part (e.g. an injection-molded part).

Some embodiments may provide one or more straws that view a region that is not in the target region of the system, including regions that are not flat or regions that are not parallel to the target plane (in cases where the target region comprises a plane). By way of example, some embodiments may wish to detect when the system is badly mispointed, which may lead to sunlight falling well outside the focal region.

Some embodiments may provide detectors at places other than the breech end of the straw.

Embodiments may choose various interior (or "internal") surfaces for the straws. In one embodiment, the straws may comprise a substantially non-reflective interior surface, to help limit the field of view. Partially reflective interior surfaces may be used, within limits. In another embodiment, a somewhat reflective internal surface may be used, up to a hemispherical diffuse reflectance of about 90% at wavelengths at which the detector is sensitive (e.g. 400-1100 nm for a typical silicon detector), and up to 30% specular reflectance at those wavelengths.

One useful embodiment provides a set of eight (overlapping or non-overlapping) regions, each observed by a respective photodetector, to provide both narrow-angle and wide-angle sensing. In some such embodiments, the precision of a narrow-angle sensor is higher, and the wide-angle sensor has a greater acquisition range, which can be important during system startup, for example.

Figure 4:
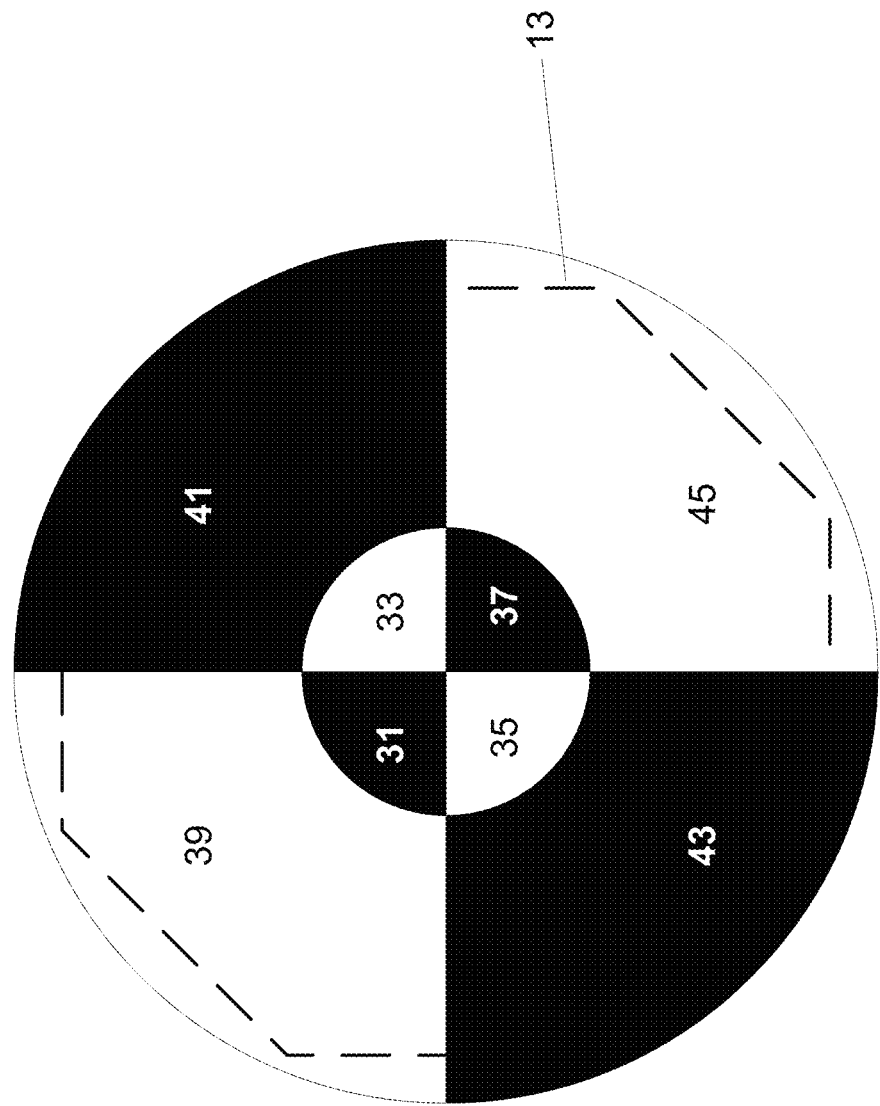
FIG. 4 shows the mapping of the target region to a set of eight detector apertures.

One such embodiment divides up target region 13 as shown in FIG. 4. In the figure, regions 31, 33, 35, and 37 are viewed by one set of detectors, while regions 39, 41, 43, and 45 are viewed by another set of detectors. The figure illustrates another important concept, which is that the regions of view provided by the detectors need not map exactly to the target region (as exemplified by the octagonal shape 13 of the figure). Detectors may view more or less than the full target region, and they may leave parts of the target region unobserved.

Further, in some embodiments, detectors may be combined, or their regions of view may overlap. For example, in FIG. 4, there is no need to isolate region 31 from region 39—region 39 may be expanded to include and overlap with region 31. Or, they may be kept non-overlapping, but software may choose to combine the two regions into one virtual region, for example during acquisition.

In the exemplary embodiments, the masks 23 were provided in a plane that is parallel to the plane comprising target region 13. However, masks may be provided in any desired plane, or even in a non-planar configuration. The shape of the opening in the mask maps to the shape of the target region projected into the plane(s) of the mask, along the line of sight from the center of the straw to the detector.

Figure 5:
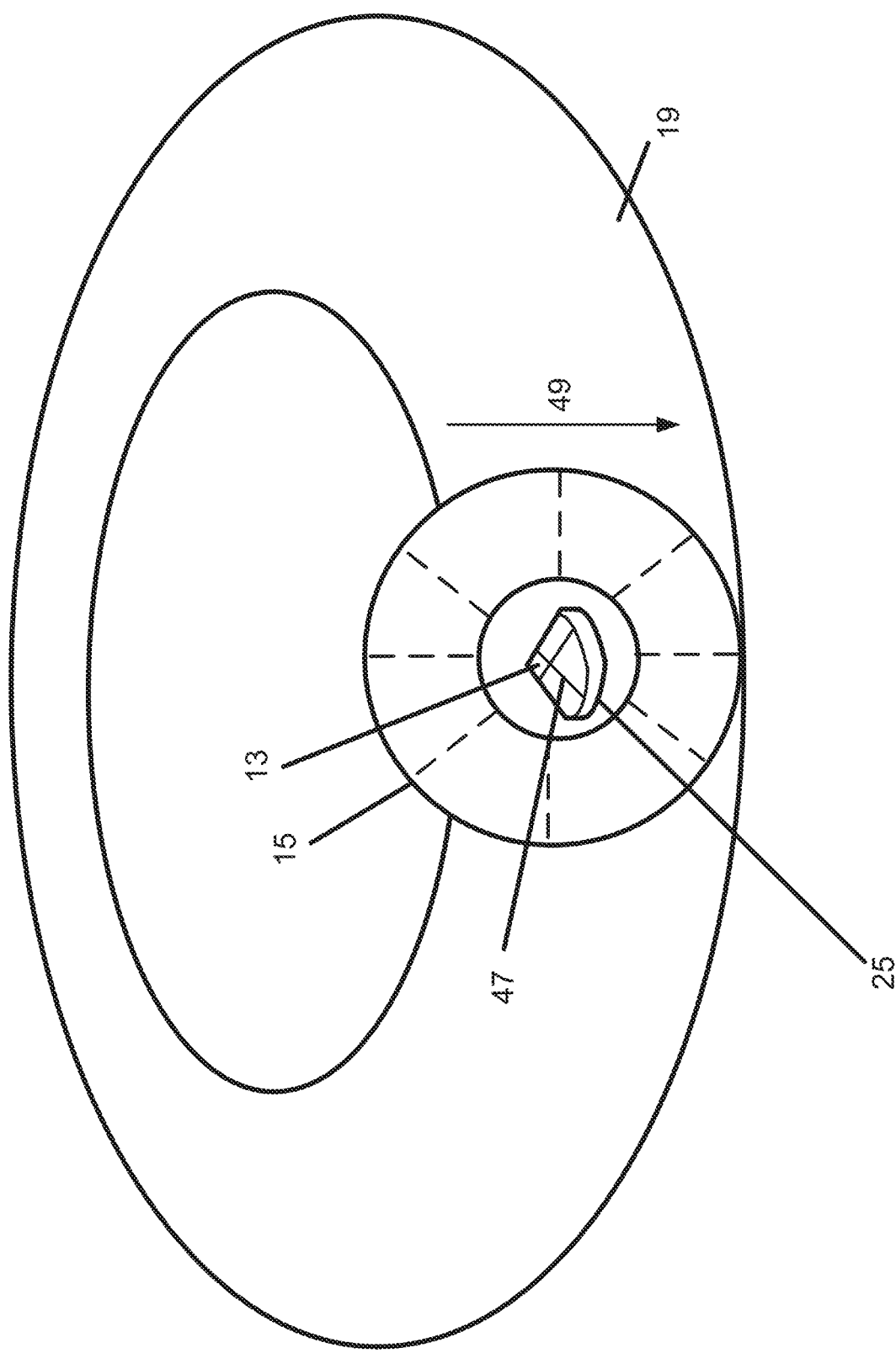
FIG. 5 is a photograph of a portion of the target region, looking through the mask, as seen from the perspective of the detector.

FIG. 5 is a photograph that illustrates this effect. A photograph is provided so that the perspective of looking down the straw can be clearly understood. This is a photograph of the exemplary embodiment of FIG. 1, taken from the breech end of straw 15, from the point of view of detector 17, with the camera that is taking the picture being located just an inch or two behind where detector 17 would be.

In the figure, a piece of paper, located in the target region 13, onto which quadrants 47 have been drawn by hand, is visible. From this particular perspective, it may be seen that the aperture 25 is not correctly positioned, and should be adjusted lower in the photo, in the direction of arrow 49.

It may also be seen that, due to projection effects, the mask clearly does not have the same shape as the region of the target region that the detector is viewing. While the target region quadrant is a 90-degree quadrant, the apparent apex angle of aperture 25 in the figure is clearly greater than 90 degrees, e.g., it may be about 120 degrees.

Figure 6:
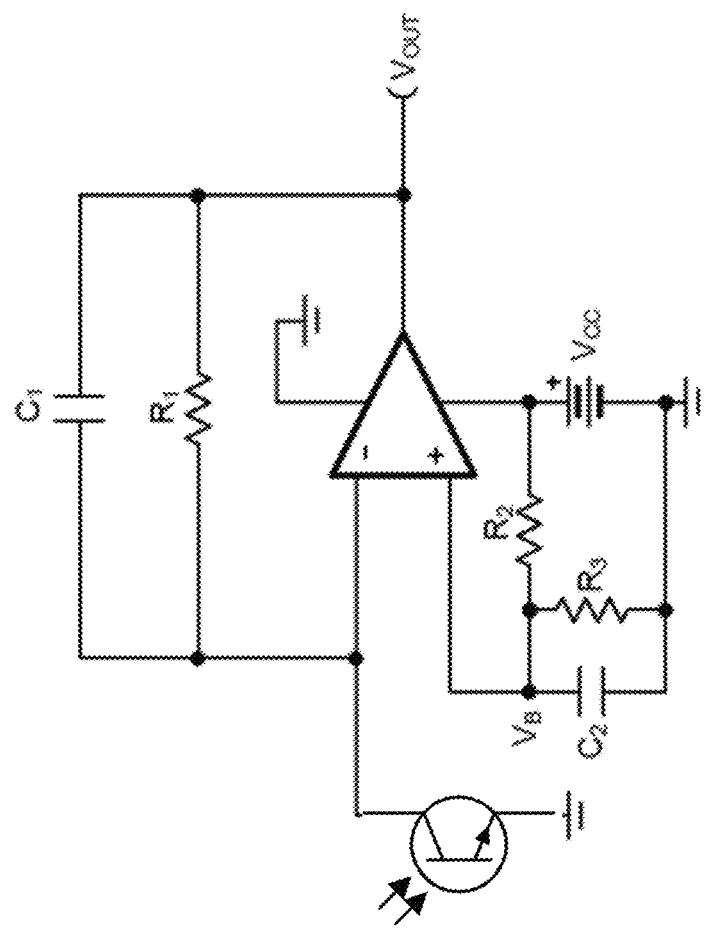
FIG. 6 is the circuit used to convert phototransistor current to voltage, in some embodiments.

For a system such as the exemplary embodiment of FIG. 1, the signals from the four photodetectors may be amplified using standard techniques and then digitized with an analog-to-digital converter such as those included in common microcontrollers. The exemplary embodiment includes the circuit shown in FIG. 6 which converts the phototransistor current into a voltage, using a MCP6004 operational amplifier.

Figure 7:
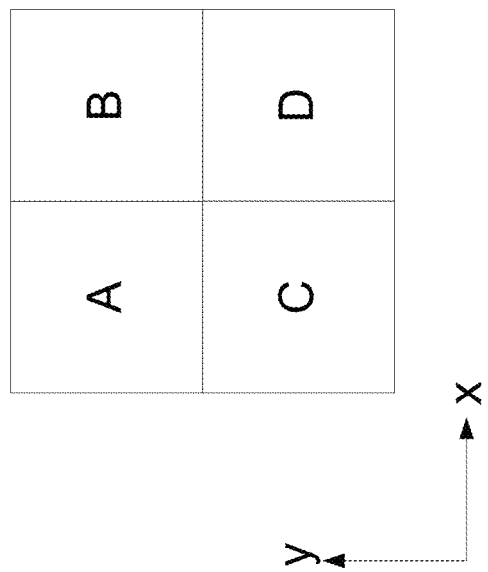
FIG. 7 shows the layout of quad cell quadrants and x-y coordinates used to convert from detector readings to x-y pointing error, in some embodiments.

Once converted into digital counts, conversion into x and y error signals follows standard quad cell techniques. A background level is measured and recorded when the system is not aimed at the sun. When aimed at the sun, we read each of the four quadrants A, B, C, and D as indicated in FIG. 7, then the background level is subtracted from each. The resulting four values are converted to x and y pointing error using the expressions $$x = \frac{(B+D)-(A+C)}{A+B+C+D}$$
$$y = \frac{(A+B)-(C+D)}{A+B+C+D}$$

Some of the embodiments described have a relatively narrow field of view. It may be desirable to also provide a sensor that has a wide field of view, even if less accurate.

Figure 8:
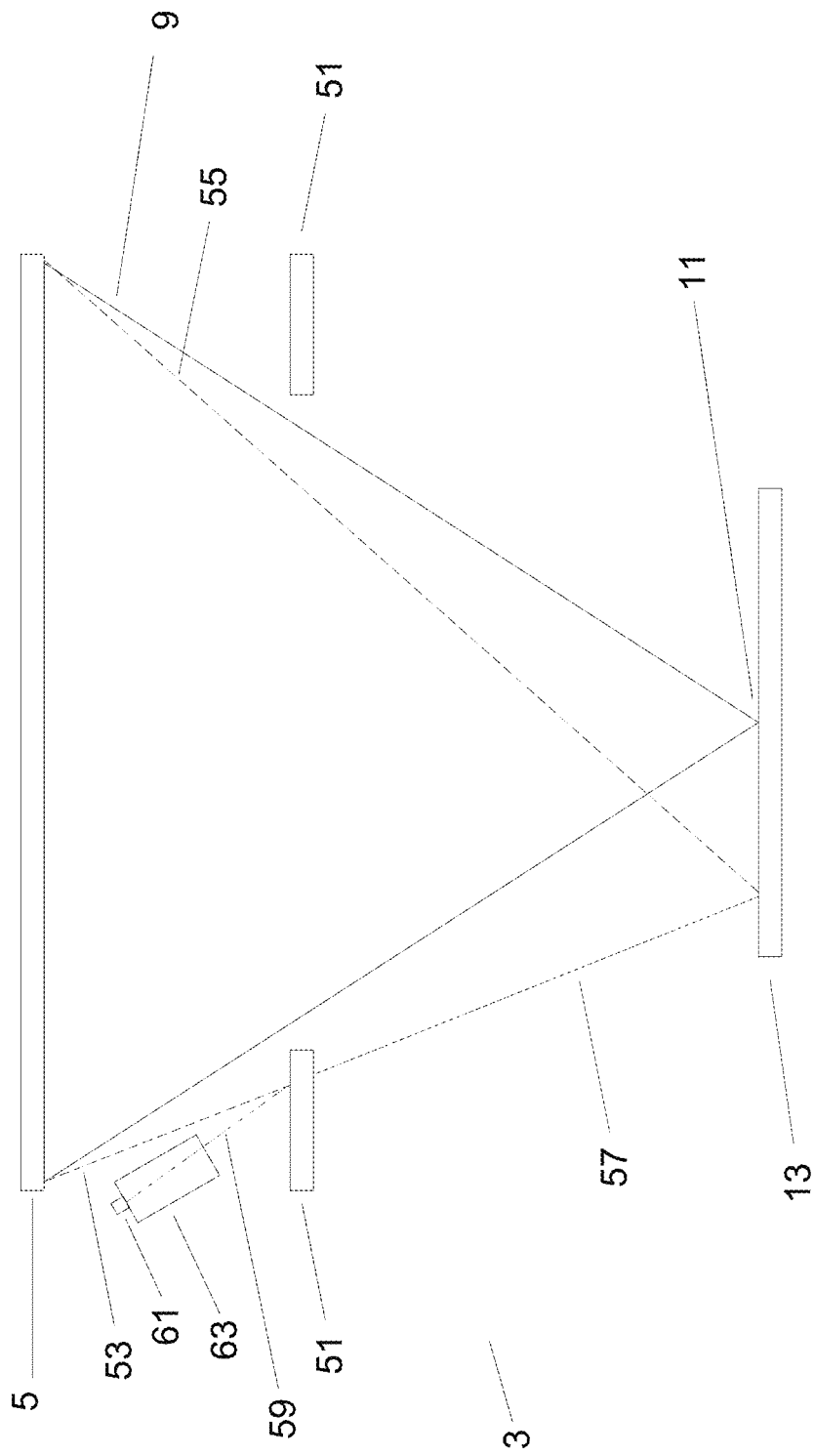
FIG. 8 shows a cross-section view of a wide-angle pointing sensor using an opaque diffusing scattering mask.
Figure 9:
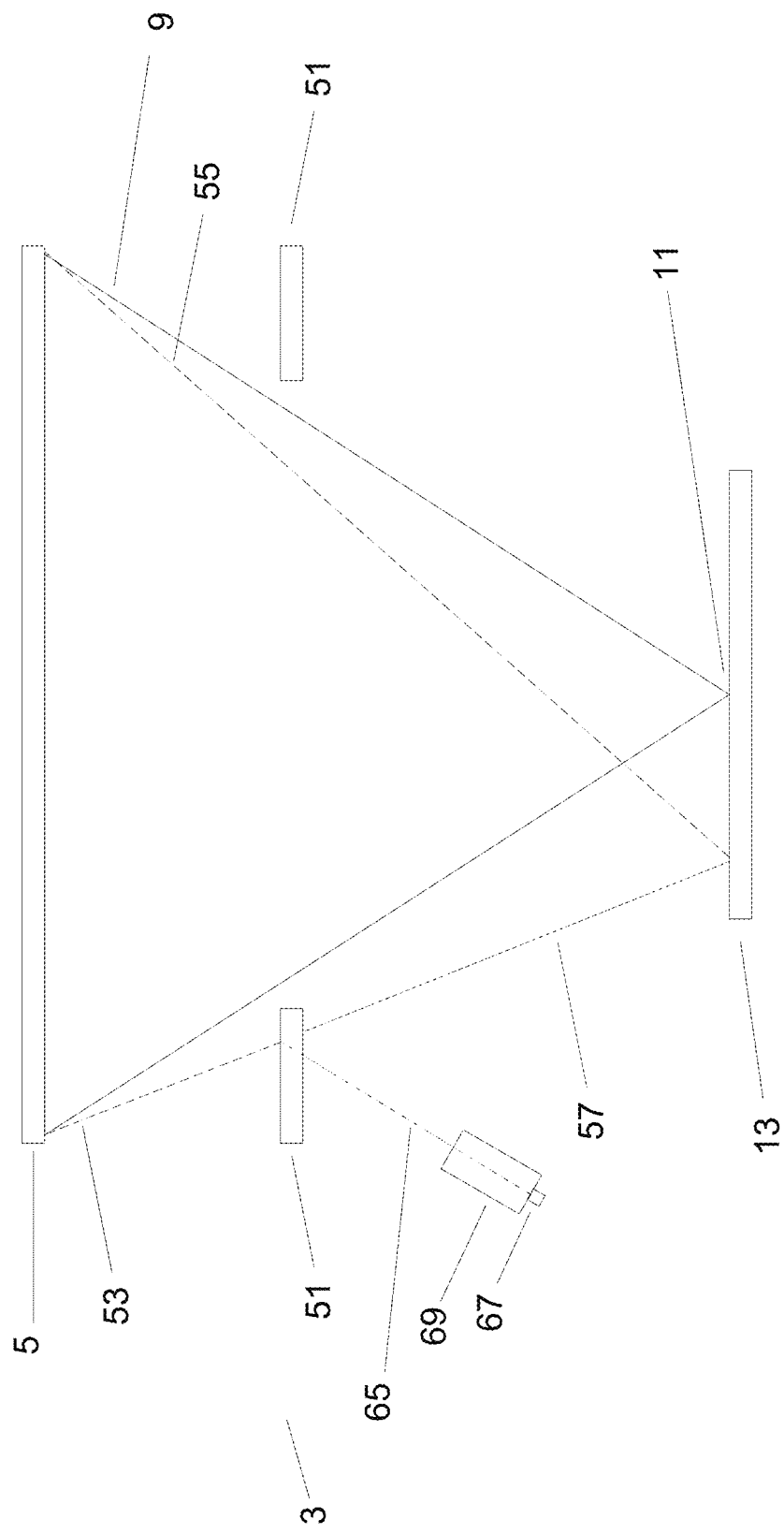
FIG. 9 shows a cross-section view of a wide-angle pointing sensor using a translucent diffusing scattering mask.

Thus, in other embodiments, as shown in FIG. 8 and FIG. 9, a plurality of photodetectors can provide a wide field of view using a surface other than target region 13. In these embodiments, a light-scattering aperture stop 51 is provided some distance from the focus 11, in the region between the focusing element (such as lens 5) and the focus. The aperture stop 51 includes a clear or open region in the center to allow the converging beam to reach the focus. Note that although the figure shows two callouts for sheet 51, in this embodiment, the two regions shown form a single, circular sheet.

When aimed properly, converging light cone 9 tends to focus to focal point 11. However, if the converging beam is mispointed, as indicated by edge rays 53 and 55 of a mispointed light convergence cone, then a portion of the converging beam will impinge on the aperture stop, and the portion 57 of ray 53 that is below the aperture stop either does not reach target region 13 at all, or is highly attenuated.

Since aperture stop 51 is a light-scattering material, ray 53 will be scattered. FIG. 8 shows an embodiment where aperture stop 51 is an opaque diffusing material, causing light to be scattered backwards (as indicated by scattered ray 59) where it can be seen by detector 61. The light-scattering aperture stop may comprise an opaque diffuse surface, in which case it will tend to scatter light backwards as in the embodiment in FIG. 8, or it may comprise a translucent material, in which case it will tend to scatter light forwards, as in the embodiment shown in FIG. 9. In FIG. 9, forward-scattered ray 65 can be seen by detector 67. Like the narrow-angle sensor, these photodetectors are each included in an assembly which includes apertures or baffles configured to limit the field of view of each photodetector to a portion of the aperture stop, as illustrated by straw 63 in the embodiment of FIG. 8 and straw 69 in the embodiment of FIG. 9. Thus each photodetector will tend to sense light when the incident converging beam is mispointed towards it. Some embodiments may include aperture masks in the straws.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. As used herein, "types" of systems refers to "kinds" of systems.

All patents, patent applications, and publications cited herein are incorporated by reference as if individually incorporated. The foregoing detailed description has been given for clarity of understanding only. No unnecessary limitations are to be understood therefrom. The invention is not limited to the exact details shown and described, for variations obvious to one skilled in the art will be included within the invention defined by the claims, and equivalents thereof.

What is claimed is:

1. A system comprising:
   a concentrating solar collector, having a nominal focus within a target region;
   a first photodetector; and
   a first aperture between a first point in the target region and the first photodetector, such that the first point, a point in the first aperture, and a point on the first photodetector are on a straight line.

2. The system of claim 1, further comprising a first baffle configured to shield the first photodetector from light incident from a direction different from the direction from the first point.

3. The system of claim 2, further comprising:
   a second photodetector;
   a second aperture between a second point in the target region and the second photodetector, the second point being a different point from the first point; and
   a second baffle configured to shield the second photodetector from light incident from a direction different from the direction from the second point.

4. The system of claim 3, wherein:
   the first photodetector is exposed, through the first aperture, to light emitted from within a first portion of the target region, the first portion of the target region including the first point; and
   the second photodetector is exposed, through the second aperture, to light emitted from within a second portion of the target region, the second portion of the target region including the second point.

5. The system of claim 4, wherein at most 50% of the first portion of the target region is within the second portion of the target region.

6. The system of claim 4, wherein:
   a third portion of the target region includes the nominal focus;
   the third portion of the target region does not overlap the first portion of the target region; and
   the third portion of the target region does not overlap the second portion of the target region.

7. The system of claim 4, further comprising:
   a third photodetector;
   a third aperture between a third point in the target region and the second photodetector, the third point being a different point from the first point and a different point from the second point;
   a third baffle configured to shield the third photodetector from light incident from a direction different from the direction from the third point;
   a fourth photodetector;
   a fourth aperture between a fourth point in the target region and the fourth photodetector, the fourth point being a different point from the first point, a different point from the second point, and a different point from the third point; and
   a fourth baffle configured to shield the fourth photodetector from light incident from a direction different from the direction from the fourth point.

8. The system of claim 2, wherein the first baffle comprises a tube.

9. The system of claim 8, wherein the first aperture is an end of the tube.

10. The system of claim 8, wherein at a first point on an interior surface of the first baffle the interior surface has a hemispherical diffuse reflectance of less than 90% at a wavelength of 500 nm, and an incident direction with an incidence angle of 60 degrees from the perpendicular to the interior surface at the first point.

11. The system of claim 8, wherein at a first point on an interior surface of the first baffle the interior surface has a specular reflectance of less than 30%.

12. The system of claim 8, wherein the first baffle comprises a mask, the first aperture being an opening in the mask.

13. The system of claim 12, wherein the mask is at a proximal end of the tube.

14. The system of claim 12, wherein the mask is at a first distance from a proximal end of the tube, the first distance being at least 30% of the length of the tube.

15. The system of claim 8, wherein the tube has a length at least twice as great as a greatest transverse dimension of the first aperture.

16. The system of claim 8, wherein a distal end of the tube is at least twice as distant from the nominal focus as the proximal end of the tube.

17. The system of claim 1, further comprising:
a diffusing aperture stop; and
a second photodetector,
the diffusing aperture stop being above the target region and having a central aperture,
the system being configured:
in a first alignment, to direct sunlight incident on the system from above through the central aperture of the diffusing aperture stop and onto the nominal focus; and
in a second alignment, to direct sunlight onto a first point, on the diffusing aperture stop, adjacent to the central aperture, and to cause a portion of the sunlight to scatter from the first point into the second photodetector.

18. The system of claim 1, wherein:
the first photodetector comprises:
an optical fiber, and
a photosensor,
wherein the optical fiber has:
a proximal end configured to receive light, from the first point, through the first aperture, and
a distal end, configured to couple light to the photosensor.

* * * * *